US009547067B2

(12) United States Patent
Basha et al.

(10) Patent No.: US 9,547,067 B2
(45) Date of Patent: Jan. 17, 2017

(54) METHOD OF ESTIMATING THE POSITION OF A USER DEVICE

(71) Applicant: SENSEWHERE LIMITED, Edinburgh (GB)

(72) Inventors: Syed Usman Basha, Edinburgh (GB); Tughrul Sati Arslan, Edinburgh (GB); Firas Alsehly, Edinburgh (GB); Zankar Upendrakumar Sevak, Edinburgh (GB)

(73) Assignee: SENSEWHERE LIMITED, Edinburgh (GB)

( * ) Notice: Subject to any disclaimer, the term of this patent is extended or adjusted under 35 U.S.C. 154(b) by 136 days.

(21) Appl. No.: 14/346,424

(22) PCT Filed: Sep. 24, 2012

(86) PCT No.: PCT/GB2012/052359
§ 371 (c)(1),
(2) Date: Mar. 21, 2014

(87) PCT Pub. No.: WO2013/041889
PCT Pub. Date: Mar. 28, 2013

(65) Prior Publication Data
US 2014/0243015 A1 Aug. 28, 2014

Related U.S. Application Data

(60) Provisional application No. 61/650,071, filed on May 22, 2012.

(30) Foreign Application Priority Data

Sep. 23, 2011 (GB) .................................. 1116524.8

(51) Int. Cl.
*H04W 24/00* (2009.01)
*G01S 5/02* (2010.01)

(52) U.S. Cl.
CPC ............ *G01S 5/0284* (2013.01); *G01S 5/0226* (2013.01); *G01S 5/0242* (2013.01); *G01S 5/0252* (2013.01)

(58) Field of Classification Search
None
See application file for complete search history.

(56) References Cited

U.S. PATENT DOCUMENTS 8,200,251 B2   6/2012   Huang
8,700,060 B2   4/2014   Huang
(Continued)

FOREIGN PATENT DOCUMENTS

WO   WO 2006/110181   10/2006
WO      2010/075369    7/2010
(Continued)

OTHER PUBLICATIONS

International Search Report issued for PCT/GB2012/052359, mailed Jan. 21, 2013.
(Continued)

*Primary Examiner* — Marivelisse Santiago Cordero
*Assistant Examiner* — Moustapha Diaby
(74) *Attorney, Agent, or Firm* — Nixon & Vanderhye P.C.

(57) ABSTRACT

Data concerning the strength of signals received from electromagnetic signal sources within a building is obtained at a plurality of points. Instead of storing the raw data for use in positioning, the data for each electromagnetic signal source is fitted to a function of received signal strength with distance from the electromagnetic signal source. This data is then used to estimate the position of a user device. The advantage of the invention is that the amount of data which requires to be stored is significantly reduced.

21 Claims, 12 Drawing Sheets

(56) References Cited

U.S. PATENT DOCUMENTS

| | | |
|---|---|---|
| 2004/0203904 A1* | 10/2004 | Gwon .................. G01S 5/0252 455/456.1 |
| 2005/0096068 A1* | 5/2005 | Bahl .................. G01C 21/206 455/456.1 |
| 2006/0019679 A1 | 1/2006 | Rappaport et al. |
| 2006/0176849 A1 | 8/2006 | Gass |
| 2006/0217131 A1 | 9/2006 | Alizadeh-Shabdiz et al. |
| 2006/0240840 A1* | 10/2006 | Morgan .................. G01S 5/02 455/456.1 |
| 2007/0133487 A1 | 6/2007 | Wang et al. |
| 2007/0178911 A1 | 8/2007 | Baumeister et al. |
| 2009/0154371 A1* | 6/2009 | Alizadeh-Shabdiz G01S 5/0252 370/252 |
| 2010/0127933 A1* | 5/2010 | Kuo .................. G01S 5/0252 342/386 |
| 2010/0324813 A1 | 12/2010 | Sundararajan et al. |
| 2011/0102267 A1 | 5/2011 | Janiszewski et al. |
| 2011/0205125 A1 | 8/2011 | Lin et al. |
| 2012/0133555 A1 | 5/2012 | Hyun |
| 2012/0157123 A1 | 6/2012 | Li et al. |

FOREIGN PATENT DOCUMENTS

| | | |
|---|---|---|
| WO | 2011/047310 | 4/2011 |
| WO | 2011/127659 | 10/2011 |
| WO | 2012/082828 | 6/2012 |

OTHER PUBLICATIONS

Tarrio, P. et al., "An RSS Localization Method Based on Parametric Channel Models", Sensor Technologoes and Applications, (Oct. 14, 2007), pp. 265-270.

* cited by examiner

| MAC Address | X | Y | Z |
|---|---|---|---|
| 00:13:5F:F9:23:D0 | 8.91 | 6.73 | 2.65 |
| 00:15:C7:A9:E6:01 | 12.13 | 19.25 | 2.97 |
| 00:12:44:B3:31:70 | 15.45 | 26.11 | 2.95 |
| 00:13:5F:F8:F3:F0 | 8.76 | 26.00 | 5.82 |
| 00:1B:8F:88:9C:20 | 4.46 | 56.15 | 5.82 |

Fig. 2

| 00:1B:8F:88:9C:20 | | 00:12:44:B3:31:70 | | 00:13:5F:F8:F3:F0 | | 00:13:5F:F9:23:D0 | |
|---|---|---|---|---|---|---|---|
| Signal Strength | Distance | Signal Strength | Distance | Signal Strength | Distance | Signal Strength | Distance |
| -83.72727 | 35.602566 | -82.72727 | 10.085565 | -48.91102 | 5.7364535 | -85.8 | 14.17823 |
| -84.22727 | 35.647568 | -83.309525 | 9.635149 | -51.805084 | 5.602089 | -86.38461 | 14.118559 |
| -84.833336 | 35.70099 | -85.9375 | 9.195576 | -54.818966 | 5.5195017 | -88.0 | 14.080135 |
| -76.0 | 34.707355 | -83.62712 | 8.641679 | -50.177967 | 4.561239 | -87.5 | 15.07084 |
| -81.26667 | 34.652405 | -84.92308 | 9.108024 | -47.49138 | 4.6608367 | -86.0 | 15.106744 |
| -86.6 | 34.606106 | -84.62069 | 9.583246 | -45.971832 | 4.821504 | -86.5 | 15.162527 |
| -84.57143 | 33.60986 | -84.38636 | 9.162893 | -44.483334 | 3.948025 | -85.13333 | 16.148752 |
| -81.25 | 33.657528 | -82.166664 | 8.664646 | -43.152542 | 3.75012 | -86.666664 | 16.096388 |
| -82.86957 | 33.7141 | -86.545456 | 8.173041 | -48.970833 | 3.6255896 | -87.57143 | 16.062696 |
| -86.0 | 32.721256 | -84.0 | 7.805037 | -40.329166 | 2.7358546 | -88.0 | 17.055504 |
| -87.13636 | 32.662964 | -85.333336 | 8.318419 | -41.245834 | 2.898862 | -87.30769 | 17.087238 |
| -85.34286 | 32.613842 | -83.361115 | 8.83621 | -42.282257 | 3.1506984 | -84.46667 | 17.136576 |
| -82.15385 | 31.618073 | -84.07143 | 8.613861 | -41.40574 | 2.503378 | -85.242424 | 18.125734 |
| -85.111115 | 31.66874 | -83.520836 | 8.081838 | -38.658333 | 2.177935 | -86.23077 | 18.079096 |
| -84.2 | 31.728859 | -85.14286 | 7.5523906 | -37.3375 | 1.9557353 | | |

Fig. 4A

| 00:1B:8F:88:9C:20 | 00:12:44:B3:31:7 | 00:13:5F:F8:F3:F0 | 00:13:5F:F9:23:D0 | 00:15:C7:A9:E6:01 | | | | | |
|---|---|---|---|---|
| Signal Strength Distance | Signal Strength Distance | Signal Strength Distance | Signal Strength Distance | Signal Strength Distance |
| -83.72727 35.602566 | -82.72727 10.085565 | -48.91102 5.7364535 | -85.8 14.17823 | -84.958336 5.4459343 |
| -84.22727 35.647568 | -83.309525 9.635149 | -51.805084 5.602089 | -86.38461 14.118559 | -83.46 4.9424386 |
| -84.833336 35.70099 | -85.9375 9.195576 | -54.818966 5.5195017 | -88.0 14.080135 | -84.77551 4.4499664 |
| -76.0 34.707355 | -83.62712 8.641679 | -50.177967 4.561239 | -87.5 15.07084 | -81.986664 4.8623247 |
| -81.26667 34.652405 | -84.92308 9.108024 | -47.49138 4.6608367 | -86.0 15.106744 | -84.935486 5.3167377 |
| -86.6 34.606106 | -84.62069 9.583246 | -45.971832 4.821504 | -86.5 15.162527 | -83.058136 5.787763 |
| -84.57143 33.60986 | -84.38636 9.162893 | -44.483334 3.948025 | -85.13333 16.148752 | -84.210526 6.2720175 |
| -81.25 33.657528 | -82.166664 8.664646 | -43.152542 3.75012 | -86.666664 16.096388 | -83.9 5.84018 |
| -82.86957 33.7141 | -86.545456 8.173041 | -48.970833 3.6255896 | -87.57143 16.062696 | -85.35555 5.429752 |
| -86.0 32.721256 | -84.0 7.805037 | -40.329166 2.7358546 | -88.0 17.055504 | -85.8 6.10919 |
| -87.13636 32.662964 | -85.333336 8.318419 | -41.245834 2.898862 | -87.30769 17.087238 | -81.0 6.4767046 |
| -85.34286 32.613842 | -83.361115 8.83621 | -42.282257 3.1506984 | -84.46667 17.136576 | -86.74545 6.868639 |
| -82.15385 31.618073 | -84.07143 8.613861 | -41.40574 2.503378 | -85.242424 18.125734 | -85.30645 7.5510397 |
| -85.111115 31.66874 | -83.520836 8.081838 | -38.658333 2.177935 | -86.23077 18.079096 | -85.51111 7.1963673 |
| -84.2 31.728859 | -85.14286 7.5523906 | -37.3375 1.9557353 | | -85.63636 6.867474 |

Scan from mobile device

00:13:5F:F8:F3:F0  -48.91102
00:1B:2B:6B:18:6E  -70.660255
00:1B:8F:88:A0:BE  -70.682205
00:12:44:B3:31:70  -82.72727
00:1B:8F:88:9C:20  -83.72727
00:15:C7:A9:E6:01  -84.958336
00:13:5F:F9:23:D0  -85.8

Scan from database

@x 7.65;@y 22.67;@z 4.5
00:13:5F:F8:F3:F0  -43.152542
00:1B:8F:88:A0:BE  -72.16239
00:1B:2B:6B:18:6E  -72.52809
00:1B:8F:88:9C:20  -81.25
00:12:44:B3:31:70  -82.166664
00:15:C7:A9:E6:01  -83.9
00:13:5F:F9:23:D0  -86.666664

$$D_{sig} = \left[ \sum_{i=0}^{n} \left| SS_{APi} - \overline{SS}_{APi} \right|^2 \right]^{1/2}$$

$D_{sig}$= [(-48.91102 +43.152542)$^2$+ (-70.660255+72.52809)$^2$+(-70.682205+72.16239)$^2$+(-82.72727+82.166664)$^2$
+(-83.72727+-81.25)$^2$+(-84.958336+-83.9)$^2$+(-85.8+ -86.666664)$^2$]$^{1/2}$ $D_{sig}$= 6.8674

This calculation is done for all the scans stored (18 in this test area)

| MAC Address | X | Y | Z |
|---|---|---|---|
| 00:13:5F:F9:23:D0 | 8.91 | 6.73 | 2.65 |
| 00:15:C7:A9:E6:01 | 12.13 | 19.25 | 2.97 |
| 00:12:44:B3:31:70 | 15.45 | 26.11 | 2.95 |
| 00:13:5F:F8:F3:F0 | 8.76 | 26 | 5.82 |
| 00:1B:8F:88:9C:20 | 4.46 | 56.15 | 5.82 |

Access points location data

Fig. 10

METHOD OF ESTIMATING THE POSITION OF A USER DEVICE

This application is the U.S. national phase of International Application No. PCT/GB2012/052359, filed 24 Sep. 2012, which designated the U.S., and claims priority to GB Application No. 1116524.8 filed 23 Sep. 2011, and claims the benefit from U.S. Provisional Application No. 61/650,071, filed 22 May 2012, the entire contents of each of which are hereby incorporated by reference.

FIELD OF THE INVENTION

The invention relates to the field of estimating the position of user devices, such as cellular telephones, personal digital assistants, laptop computers and other personal electronic devices.

BACKGROUND TO THE INVENTION

It is known to estimate the position of user devices by carrying out measurements of received signal strength from plurality of electromagnetic signal sources of known position (for example wireless access points, such as WiFi devices, Bluetooth enabled devices, radio beacons etc). Known techniques are especially useful indoors where global satellite navigation systems do not function reliably or at all.

In order to map a building for use with such a system, it is known to accurately measure the position of a plurality of electromagnetic signal sources in two or three dimensions, and then to systematically move through the building, carrying out scans at each of a plurality of accurately measured scanning points. At each point, a measurement is made of the received signal strength from each of the electromagnetic signal sources which can be detected at that location. The resulting data is stored in a database. During operation of the system, a user device scans for electromagnetic signal sources and then carries out measurements of received signal strength for each of the electromagnetic signal sources found in the scan. The resulting measurements are then compared with the data stored in the database and the position of the user device is assessed as being the position of the scanning point, from amongst the plurality of scanning points, where the measured data most closely corresponds to that stored in a database. It may also be possible to interpolate between scanning points. Known techniques to estimate the position of a user device in such a system include the use of fingerprinting techniques to compare the measured data with the data stored in the database.

Such methods have been found to be practically useful. However, the volume of data which must be stored in the database is prohibitive. Accordingly, the invention provides a method of obtaining estimates of the position of a user device which require less data to be stored.

US2007/0133487 describes a method of providing an estimate of a mobile location of a wireless node, point or terminal in a wireless local area network. A signal strength fingerprint algorithm is used to build up a signal strength database or radio map for a building. This involves measuring signal powers from wireless access points at a plurality of points in the building, and applying a linear regression algorithm to estimate mobile received signal strengths at a plurality of grid points within the building. In order to determine the mobile location of the wireless node, point or terminal, signal power received by the wireless node, point or terminal is correlated with the signal strength database or radio map to determine which grid point correlates most closely with the received signal powers. This would require the estimated received signal strengths at each grid point to be generated and stored in a memory for correlation with the received signal powers.

SUMMARY OF THE INVENTION

According to a first aspect of the present invention there is provided a method of estimating the position of a user device comprising the steps of:

at each of a plurality of measurement points of known position (typically obtained through measurement of their position at the time of scanning) within a zone, scanning for electromagnetic signal sources of known position (typically wireless access points, such as WiFi devices, Bluetooth enabled device, radio beacons etc. whose position has previously been measured), obtaining and storing measurements of the strength of the signal received (measurements of received signal strength) from the scanned electromagnetic signal sources, to thereby obtain measurements of the strength of the signal received from a plurality of electromagnetic signal sources at a plurality of measurement points within the zone;

processing the stored data, the positions of the plurality of measurement points and the positions of the electromagnetic signal sources and, for each of the electromagnetic signal sources, fitting the measurements of received signal strength to a function of received signal strength with distance between the respective measurement point and the respective electromagnetic signal source (for example, using a least square fit or any other fit known in the art), thereby obtaining parameters of the fitted function;

for each of the electromagnetic signal sources, storing the parameters of the fitted function; and subsequently calculating the position of a user device by scanning for electromagnetic signal sources of known position, measuring the received signal strength from the scanned electromagnetic signal sources, retrieving the parameters of the function stored for the zone with reference to the scanned electromagnetic signal sources, using the function, the retrieved parameters and the received signal strengths measured by the user device to estimate the distance of the user device from each of the scanned electromagnetic signal sources; and estimating the position of the user device from the estimated distances from the scanned electromagnetic signal sources and the known positions of the electromagnetic signal sources.

The zone may simply be a region within which measurements are taken in which case details of the zone may not need to be stored. However, advantageously the method may carry out measurements in a plurality of zones, storing parameters for each zone and then using the parameters for the zone in which the user design is present to estimate the position of the user device. Thus, preferably, the parameters of the function are stored with reference to the respective zone. Preferably, measurements are taken at a plurality of measurement points in each zone and parameters are calculated and stored with reference to each of a plurality of zones. Typically, measurements are taken at a plurality of measurement points in each of a plurality of zones, and one or more parameters are calculated from the measurements taken in each zone, the said one or more parameters being stored with reference to the said each zone. Typically the said one or more parameters calculated with respect to a first one of the plurality of zones are different from the said one or more parameters calculated and stored with respect to a second one of the plurality of zones different from the first. Typically, a plurality of the said zones are adjacent. Typically, one or more of the electromagnetic signal sources is/are detectable by a user device in each of a plurality of the said zones. In one embodiment, at least 50%, preferably at least 60%, more preferably at least 70% and even more preferably at least 80% of the electromagnetic signal sources are detectable by a user device in each of a plurality of zones. Typically, for one or more of the electromagnetic signal sources (and preferably for the majority of the electromagnetic signal sources), parameters of the fitted function are stored in respect of the respective electromagnetic signal source in at least two, or at least four, or at least six, or at least ten zones. The zones may, for example, represent regions within a building with each region of the building being in one of the zones. A plurality of zones may be provided to represent a single building. For example, a plurality of zones may be provided, each zone representing a different floor of a building. Each zone may alternatively represent a different portion of a floor of a building. Each zone may alternatively represent a plurality of floors of a building, or one or more fractions of one or more floors of a building. Each zone may alternatively represent a different room of a building, a plurality of rooms of a building or one or more fractions of one or more rooms of a building. Each zone of a plurality of the said zones may cover a different sized surface area. One or more zones may cover a surface area of less than 50 $m^2$, less than 40 $m^2$, less than 30 $m^2$, less than 25 $m^2$ or less than 20 $m^2$. It may be that at least 25% of zones or at least the majority of zones cover a surface area of less than 50 $m^2$, less than 40 $m^2$, less than 30 $m^2$, less than 25 $m^2$ or less than 20 $m^2$. The surface area covered by each zone may be selected dependent on the structure and/or the layout of a building comprising at least part of that zone.

Typically, for each zone, different parameters are stored for different electromagnetic signal sources. Typically, for different zones, different parameters are stored in respect of the same electromagnetic signal source.

Preferably, the method comprises determining in which zone the user device is located from the measured signal strengths, retrieving the parameters of the function stored with reference to that respective zone and using the parameters stored with reference to that respective zone to estimate the position of the user device.

We have found that this provides a method of obtaining good quality estimates of the position of user devices, while avoiding the requirement to store raw data for each of the measurement locations. Because suitable parameters for the fitted function may vary significantly over a relatively short distance (e.g. on either side of a structural wall within a building, the most suitable parameters for the fitted function may vary significantly), dividing a locale (e.g. a building) into a plurality of zones can result in a significant improvement in the accuracy of position estimates than if a single set of parameters is provided for that locale. In addition, the need for a large memory capacity for storing fingerprint data for each point in the locale is avoided.

In order to enable the zone in which a user device is located to be identified, it may be that the method comprises storing measurements of the strength of the signal received from a plurality of electromagnetic sources for at least one (but preferably not each) measurement location in each zone. The received signals strengths measured by the user device can then be compared with these stored received signal strength values to determine in which zone the user device is located. The relevant parameters for that zone can then be obtained and used for position calculation.

The function may be a linear function of a logarithm of received signal strength with distance from the respective electromagnetic signal source. For example it may be a linear function of the received signal strength in dBmW (i.e. the ratio between received signal strength and 1 mW expressed in decibels) with distance from the respective electromagnetic signal source. In that case, as a linear function has two independent parameters, it is necessary to store two independent parameters for each electromagnetic signal source.

The function may be a non-linear function of a logarithm of received signal strength with distance from the respective electromagnetic signal source. For example it may be a polynomial function of the logarithm of the received signal strength with distance from the respective electromagnetic signal source. One skilled in the art will appreciate that there are many non-linear functions which could be employed and will be familiar with environmental models of suitable non-linear functions for particular environments.

The method may comprise updating the stored parameters, for example, in response to making further measurements, or detecting a new electromagnetic signal source, or that an electromagnetic signal source has moved, and making measurement of received signal strength from that electromagnetic signal source at a plurality of measurement locations. The stored parameters may be updated responsive to detection that an electromagnetic signal source has stopped operating (e.g. been removed, or switched off). The stored parameters may be updated due to a change or correction in a map of the building (e.g. the locations of electromagnetic signal sources or walls etc.) or the boundaries of zones. The method may comprise making further measurements of the strength of the signal received from a respective electromagnetic signal source at a known position, recalculating the parameters for the respective electromagnetic signal source and updating the stored parameters. For example, further measurements might be carried out during operation of the system, by user devices, when they measure their position.

The function of received signal strength with distance from an electromagnetic signal source may be different for different electromagnetic signal sources, in at least some cases. It may be different for the same electromagnetic signal source for different zones, in at least some cases, The method may comprise storing an identifier of the function to be used for a particular electromagnetic signal source. The identifier of the function may be stored for each electromagnetic signal source for each zone.

The method may comprise changing the function which is to be used for a particular electromagnetic signal source (and for a particular zone where appropriate), for example, in response to making further measurements, or detecting a new electromagnetic signal source, or that an electromagnetic signal source has moved, and making measurement of received signal strength from that electromagnetic signal source at a plurality of measurement locations. The function may be changed responsive to detection that an electromagnetic signal source has stopped operating (e.g. been removed, or switched off). The function may be changed due to a change or correction in a map of the building (e.g. the location of electromagnetic signal sources or walls etc.) or the boundaries of zones. The method may comprise changing the function which is to be used, and calculating new parameters appropriate to the new function (optionally for an individual zone), responsive to obtaining further measurements of received signal strength with distance from an electromagnetic signal source. The method may comprise changing the stored identifier of the function (optionally for an individual electromagnetic source for an individual zone) at the same time.

During the calculating of the position of the user device, the steps of scanning for electromagnetic signal sources of known position and measuring the received signal strength from the scanned electromagnetic signal sources is carried out by the user device, but the steps of retrieving the parameters of the function stored for the zone with reference to the scanned electromagnetic signal sources, using the function, the retrieved parameters and the received signal strengths measured by the user device to estimate the distance of the user device from each of the scanned electromagnetic signal sources; and estimating the position of the user device from the estimated distances from the scanned electromagnetic signal sources and the known positions of the electromagnetic signal sources, can be carried out by the user device (e.g. by a processor of the user device) or remotely from the user device (e.g. by a remote server, e.g. by a process of a server with which the user device is in electronic communication) or by a combination of the two.

The method extends in a second aspect to a method of storing data useful to estimate the position of a user device comprising the steps of:
  at each of a plurality of measurement points of known position (typically obtained through measurement of their position at the time of scanning) within a zone, scanning for electromagnetic signal sources of known position (typically wireless access points, such as WiFi devices, Bluetooth enabled device, radio beacons etc. whose position has previously been measured), obtaining and storing measurements of the strength of the signal received (measurements of received signal strength) from the scanned electromagnetic signal sources, to thereby obtain measurements of the strength of the signal received from a plurality of electromagnetic signal sources at a plurality of measurement points within the zone;
  processing the stored data, the positions of the plurality of measurement points and the positions of the electromagnetic signal sources and, for each of the electromagnetic signal sources, fitting the measurements of received signal strength to a function of received signal strength with distance between the respective measurement point and the respective electromagnetic signal source (for example, using a least square fit or any other fit known in the art), thereby obtaining parameters of the fitted function; and
  for each of the electromagnetic signal sources, storing the parameters of the fitted function.

Preferably, the parameters are stored with reference to the respective zone. Preferably, the method is repeated for each of a plurality of zones as set out above.

The invention extends in a third aspect to a computer readable medium (such as a memory or magnetic or optical disc) storing a database comprising the parameters obtained by the method of the second invention. The invention also extends to a computing device comprising a processor and a memory storing program code which, when executed by the processor, causes the processor to carry out the method of the second aspect of the invention, or to estimate the position of a user device from the said received signal strength measurements of scanned electromagnetic signal sources obtained by a user device, by retrieving the said stored parameters of the function for the zone in which the user device is present, using the said function and the retrieved parameters to estimate the distance of the user device from each of the scanned electromagnetic signal sources; and estimating the position of the user device from the estimated distances from the scanned electromagnetic signal sources and the known positions of the electromagnetic signal sources.

Optional features mentioned in respect of any one aspect of the invention are optional features of any of the aspects of the invention.

DESCRIPTION OF THE DRAWINGS

An example embodiment of the present invention will now be illustrated with reference to the following Figures in which:
FIG. 2 is a table of the identifier and position of each of a plurality of WAPs;
FIGS. 4A and 4B show corresponding data for other WAPs;
FIG. 8 is a table of the strength of the signal received from detected WAPs and corresponding data measured at a location within a zone which best matches with the measured data;
FIG. 10 shows the calculated distance of a user device from each of a plurality of WAPs and the known position data for each WAP, used to estimate the position of the user device.

DETAILED DESCRIPTION OF AN EXAMPLE EMBODIMENT

Figure 1:
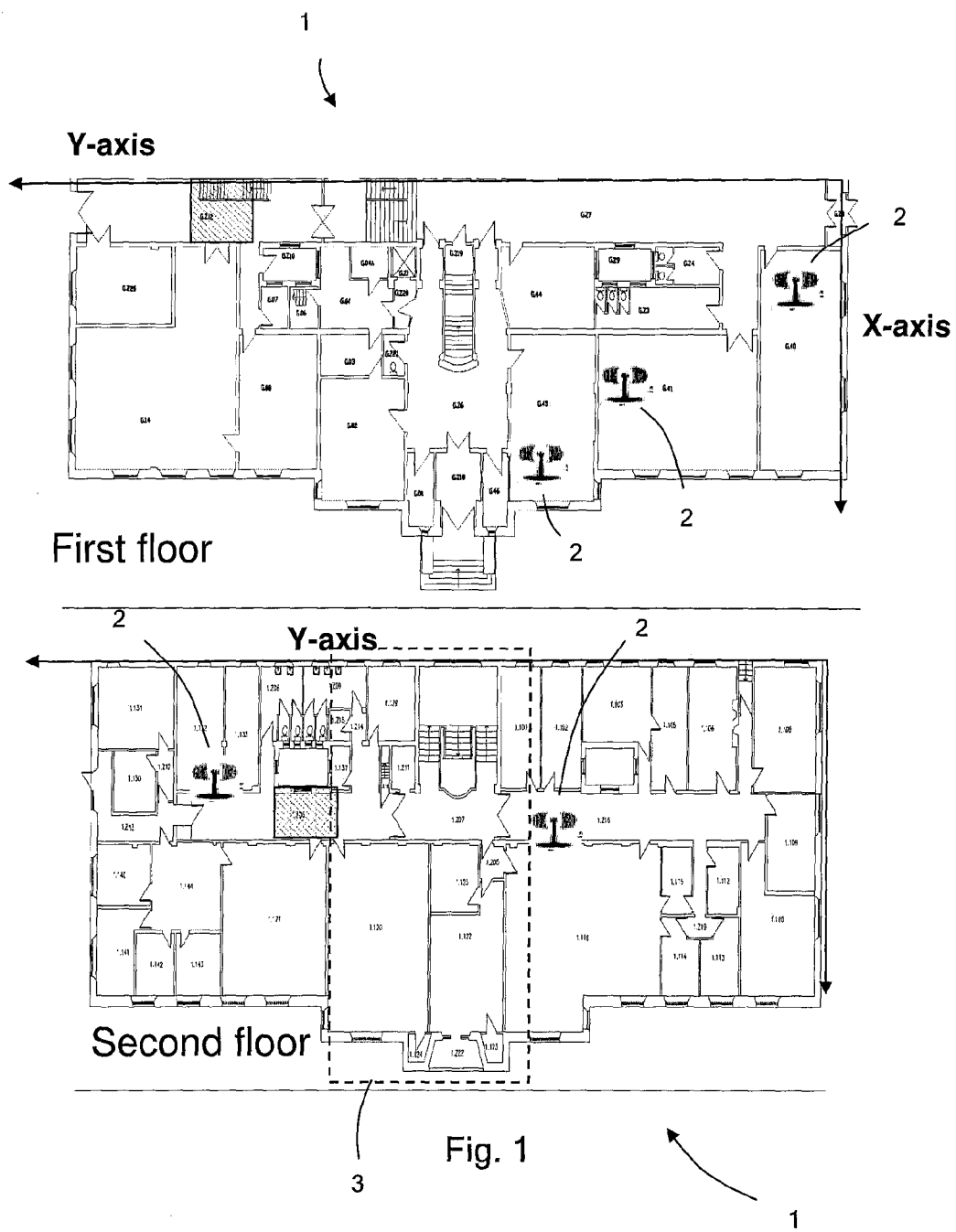
FIG. 1 is a schematic diagram of a building.

FIG. 1 is a schematic diagram of the first and second floors of a building 1, showing the location of a plurality of wireless access points (WAPs) 2. FIG. 2 is a table of an identifier for each of the WAPs, in the form of a MAC address, and its position, as X, Y and Z coordinates. The coordinates could alternatively be expressed as latitude, longitude and altitude, or in any other suitable units.

The building is divided up into zones. An example of a zone is labelled 3. Within each zone a reading is taken of the received signal strength from each of the WAPs at each of a plurality of measurement locations. The coordinates 4 of the measurement locations are stored in a table 6, along with a list of the WAPs 8 that could be scanned at that measurement location, and the received signal strength (in dBmW) 10 for each of those WAPs.

The distance, d, of each measurement location (having coordinates x1, y1, z1) from each WAP (having coordinates x2, y2, z2) is calculated as:

$$d = [(x1-x2)^2 + (y1-y2)^2 + (z1-z2)^2]^{1/2} \qquad (1)$$

Figure 3:
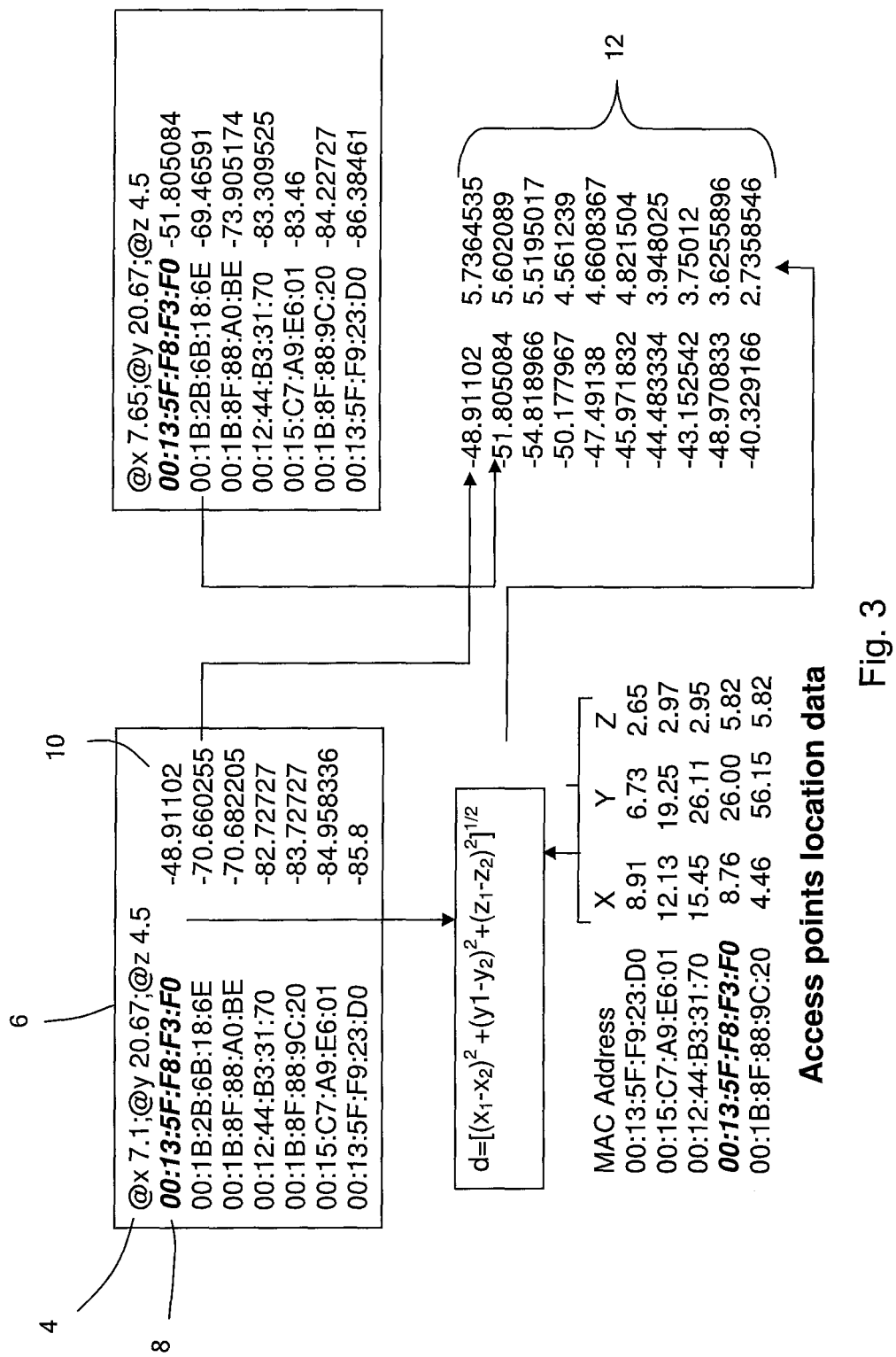
FIG. 3 shows data for the WAP having MAC address 00:13:5F:F8:F3:F0.

For each of the zones, for each of the WAPs, a table 12 is prepared of the received signal strength with distance between the respective measurement location and the respective WAP. The example shown in FIG. 3 is the data for the WAP having MAC address 00:13:5F:F8:F3:F0. FIGS. 4A and 4B show corresponding data for the other WAPs.

Figure 5A:
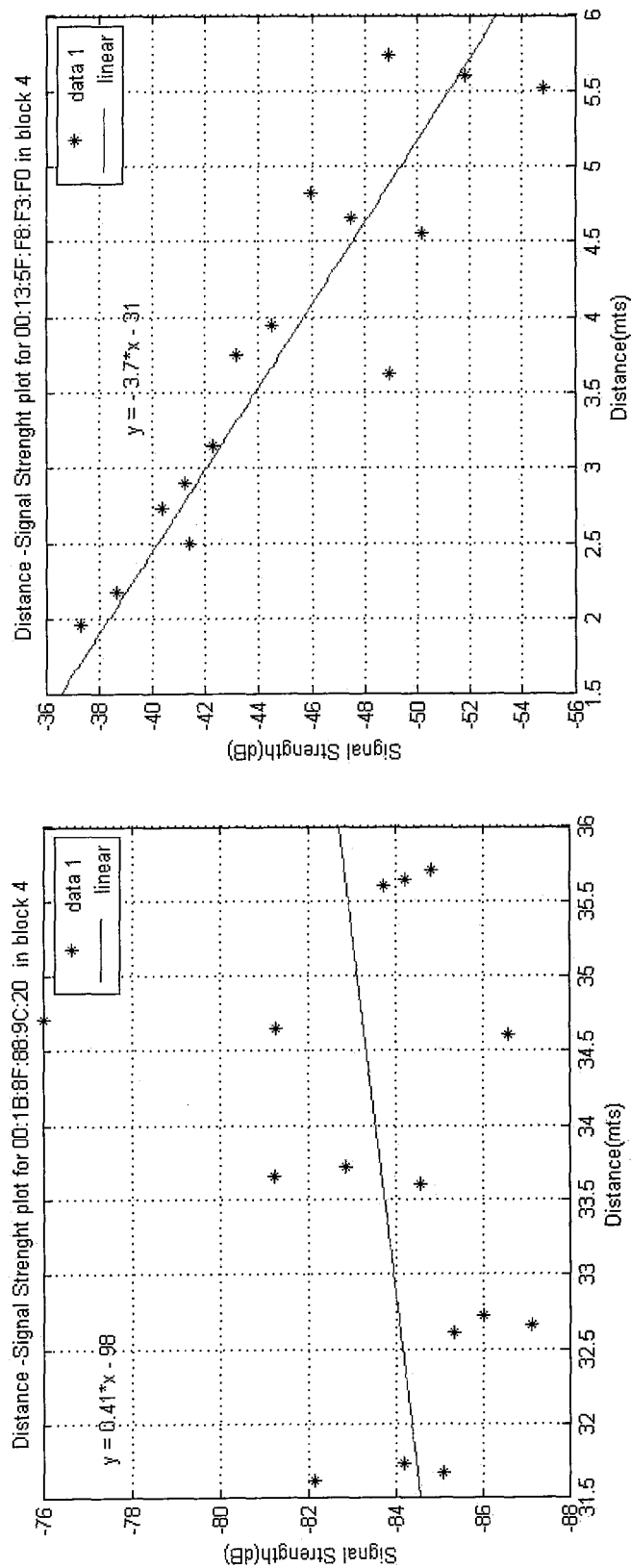
FIGS. 5A, 5B and 5C show straight line fits of the logarithm of the measured received signal strength (expressed as dBmW) with distance for each WAP.
Figure 5B:
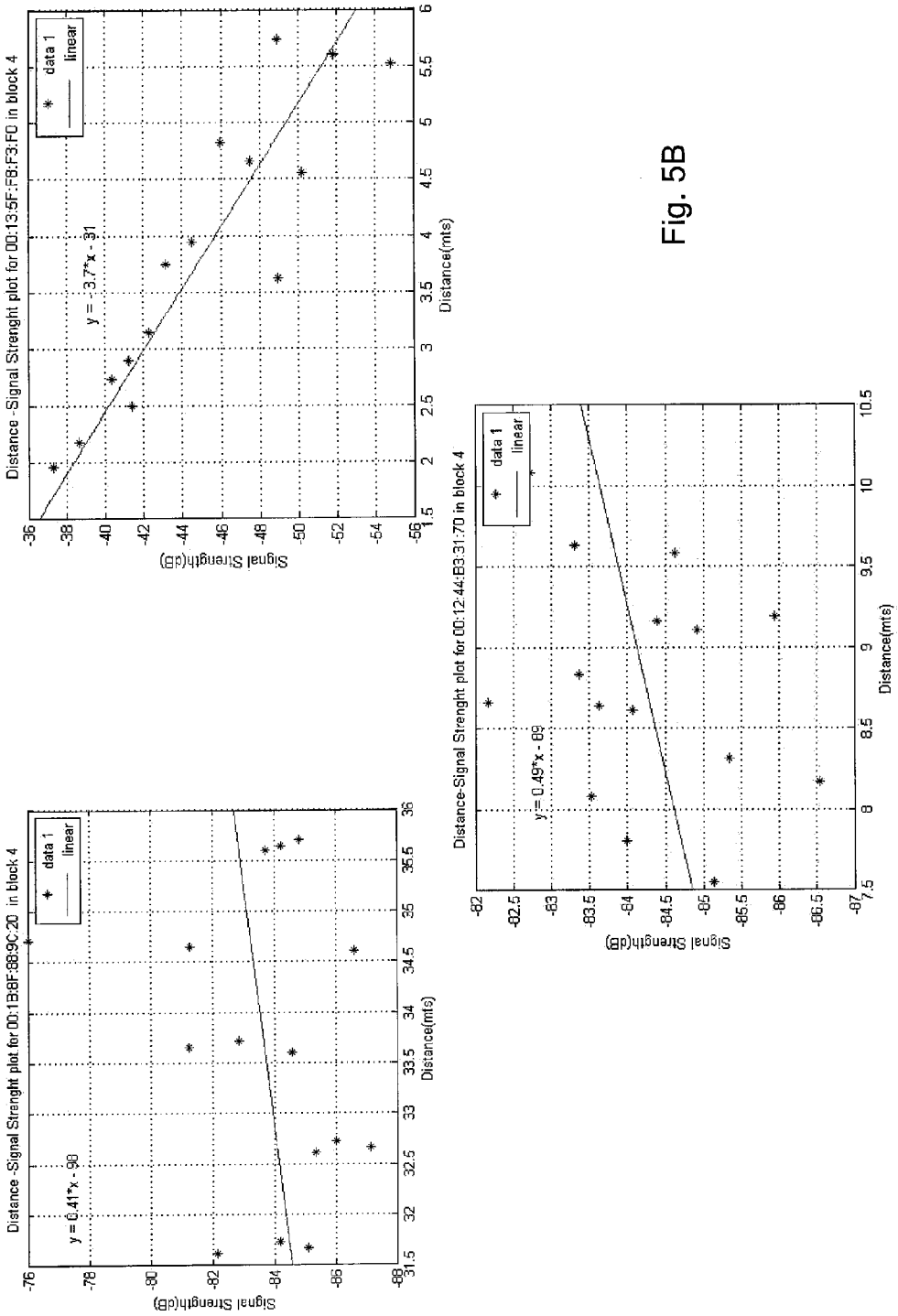
Figure 5C:
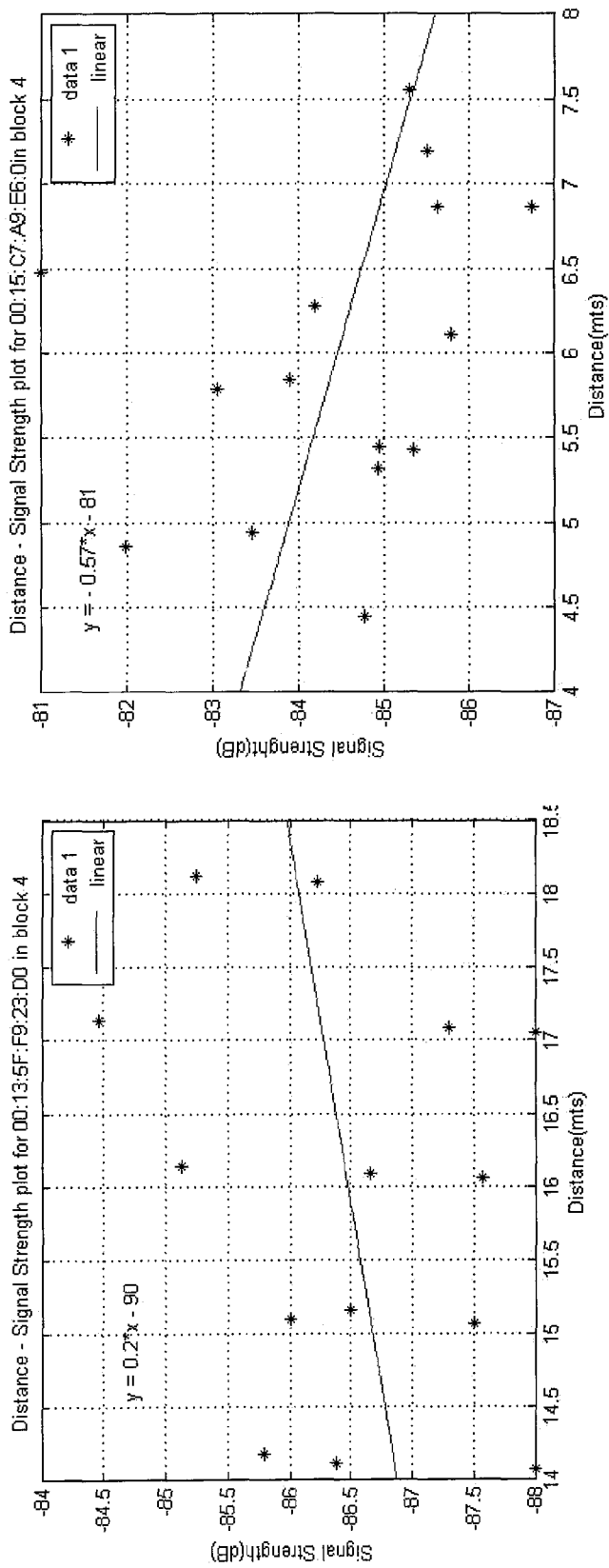

For each of the zones, for each of the WAPs, a function of received signal strength to distance from the WAP is fitted to the measured data. FIGS. 5A, 5B and 5C show straight line fits of the logarithm of received signal strength (expressed as dBmW) with distance. In each case the straight line fit can be defined by two parameters, a and b:

$$\text{logarithm of Signal strength (dBmW)} = a*\text{distance} + b \quad (2)$$

Figures 6, 7:
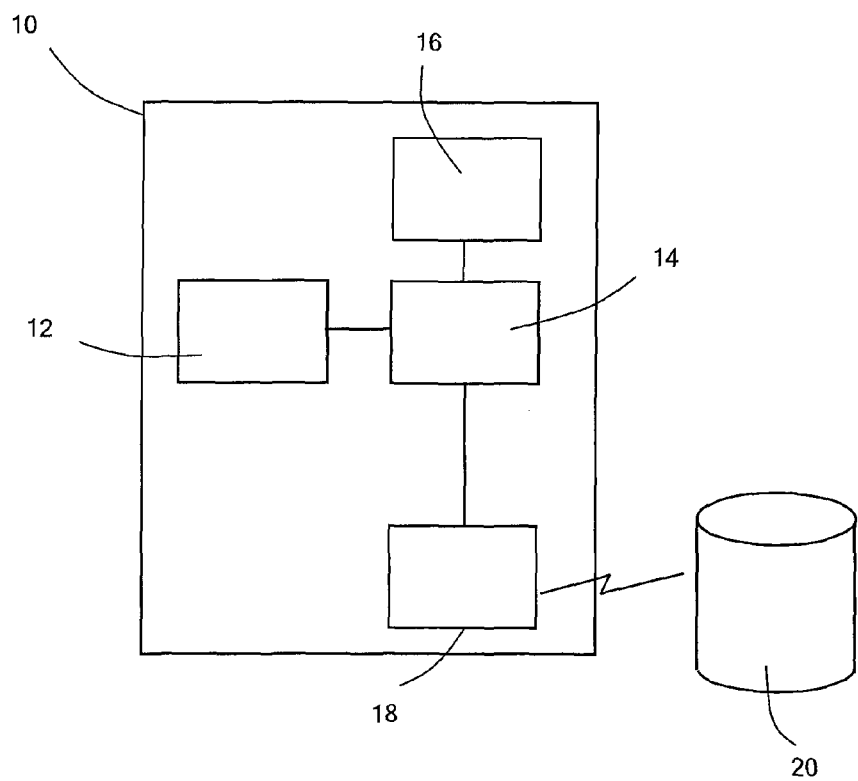
FIG. 6 summarises the straight line fits and the resulting parameters.
FIG. 7 is a schematic diagram of a user device.

FIG. 6 summarises the straight line fits and the resulting parameters. For example, for the WAP with MAC ID 00:13:5F:F9:23:D0, logarithm of signal strength (expressed in dBmW)=0.2*distance (in meters)−90 and so a=0.2 and b=−90.

The resulting parameters, for each of the zones, are stored in a database 20. Raw measurements of the signal strength of each detectable WAP for one location in each zone (typically near the middle of each zone) may also be stored in the database. However, storing raw measurements of each detectable WAP for one location in each zone is not necessary and, in some embodiments, the step of storing such raw measurements in the database is omitted. The co-ordinates of a point within (typically at the centre of) each zone are also typically stored in the database together with the relevant parameters for that zone.

With reference to FIG. 7, during operation of the system for the purpose of location determination, a user device 10, such as a cellular telephone or laptop computer, has a low range wireless transceiver 12 (e.g. a Bluetooth transceiver or a WiFi transceiver) in communication with a processor 14. The processor is in communication with a memory 16 and a cellular telephone network transceiver 18 (e.g. a GSM, GPRS or 3G transceiver) through which the processor can communicate with the database 20 through a wireless network 22.

During operation, the user device executes a program stored in the memory and uses the low range wireless transceiver to scan for wireless access points 2. With reference to FIG. 8, the strength of the signal received from each detected wireless access point is stored in a table 24. If raw measurements of the signal strength of each detectable WAP for one location in each zone are stored in the database, this received signal strength is compared with the raw measurements of the signal strength of each detectable WAP for one location in each zone and the set of readings that is most similar 26 is identified. This enables the user device to establish which zone it is located in. If raw measurements of the signal strength of each detectable WAP for one location in each zone are not stored in the database, the user device establishes which zone it is located by comparing the signal strengths received by the user device from each WAP with the signal strength expected to be received from that WAP at the centre of each zone, and selecting the zone where the expected received signal strength at its centre most closely matches the received signal strength. This comparison may be performed (indirectly) as follows. The distances between each detected WAP (whose co-ordinates are known) and the centre point of each zone (whose co-ordinates are also known) may be calculated using equation (1). A new term $f_n$ may also be defined for each of the WAPs, for each of the zones, by re-arranging equation (2) as follows:

$$f_n = \text{logarithm of Signal strength (dBmW)} - (a*\text{distance}) - b \quad (3)$$

The variable "distance" in equation (3) refers to the calculated distance between the respective WAP and the centre of a given zone, while the variable "logarithm of Signal strength" in equation (3) is the logarithm of the strength of the signal received from the said WAP by the user device. Parameters "a" and "b" are obtained from the database. If the user device is located at or near the centre of a given zone, $f_n$ for each detected WAP, for that zone, will be at or close to 0 (because equation (2) will balance). Conversely if the user device is located far from the zone centre, the magnitude of parameter $f_n$ for each detected WAP, for that zone, will be significantly greater than zero (because equation (2) will be significantly unbalanced). By summing the squares of the $f_n$ value calculated for each WAP for a given zone, another new measure, "Zone Distance" ($Z_d$), can be defined for each zone:

$$Z_d = \sqrt{f_1^2 + f_2^2 + f_3^2 + f_4^2 + f_5^2} \quad (4)$$

The greater the value of $Z_d$, the less likely the user device is to be located in the zone associated with the $Z_d$ value. Accordingly, a $Z_d$ value may be calculated for each zone and the zone which has the lowest $Z_d$ value may be selected as the zone in which the user device is located.

Figure 9:
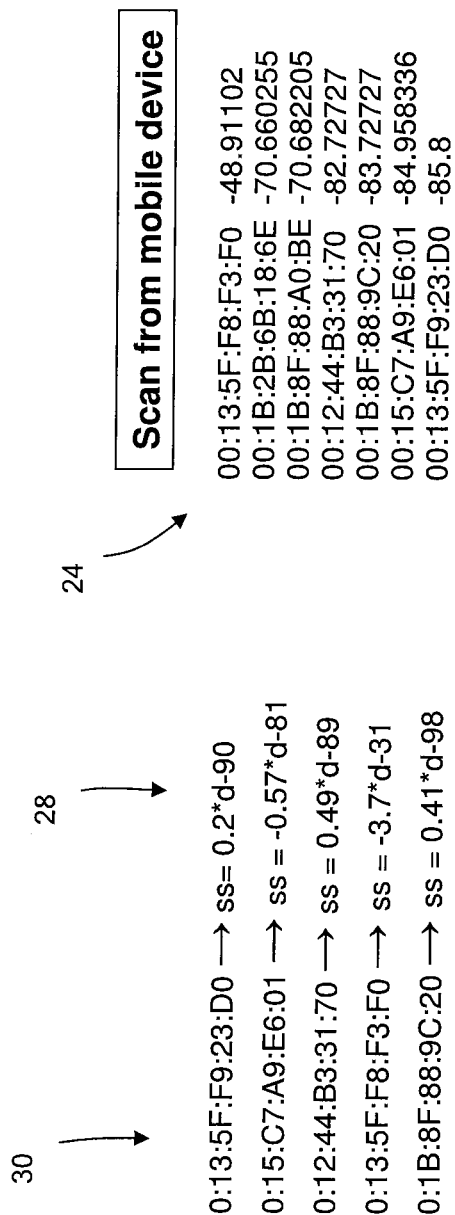
FIG. 9 is an example of parameters stored in respect of an identified zone and data obtained by measurement from a user device.

With reference to FIG. 9, once the zone has been identified, the user device reads the parameters 28 stored in respect of that zone, for each WAP 30 which can be detected. The user device then uses the stored parameters and the measured signal strength to calculate the distance 32 of the user device from each WAP. As the position of each WAP is also known, the location of the user device can be estimated. In practice, there will usually be some measurement errors and so there will not be in a position in three-dimensional space which is completely consistent with the measured data. However, one skilled in the art would appreciate that an estimate of the user device can be determined, for example by working systematically through each combination of three WAPs which can be identified, calculating the location in three-dimensional space which would be consistent with the measured distance to each of those WAPs, and then taking an average (e.g. mean or median) of the calculated positions.

Typically, a building is divided into a plurality of zones but it is possible for a building to be covered by a single zone. It is also possible for the parameters for each WAP to be stored without reference to zones, so that the parameters used to evaluate the function of received signal strength with distance from a WAP are the same from all locations where the WAP can be detected.

Although in the example presented above a single function is used (a linear relationship between the logarithm of received signal strength and distance from a WAP), alternative functions can be employed, such as polynomials or other functions, such as environmental models having additional parameters. The function used for calculating distance may vary between WAP and zone and an identifier of the function, as well as the relevant parameters, may be stored in the database and used for estimating position.

The parameters which are stored in respect of individual WAPs and individuals zones can be dynamically altered over time. For example, the parameters may be recalculated responsive to further measurements of received signal strength at new measurement locations, new measurement responsive to detecting that a new WAP is present, or has moved, or the removal of data as a WAP has been removed. Indeed, the function used for calculating distance from a WAP may also change responsive to the same events.

It may be that a database of all measurements is also retained to facilitate recalculations. However, this can be stored in a single place, remote from user devices, and the much smaller database prepared according to the invention can be used to supply only a limited amount of data to user devices during operation, minimising data storage and transfer requirements.

Although the calculation of position is described as being carried out by the user device, the calculation of position may also be carried remotely, for example at a remote server.

Further variations and modifications may be made within the scope of the invention herein described.

The invention claimed is:

1. A method of estimating the position of a user device comprising the steps of:
   at each of a plurality of measurement points of known position within a zone, scanning for electromagnetic signal sources of known position, obtaining and storing measurements of the strength of the signal received from the scanned electromagnetic signal sources, to thereby obtain measurements of the strength of the signal received from a plurality of electromagnetic signal sources at a plurality of measurement points within the zone;
   processing the stored data, the positions of the plurality of measurement points and the positions of the electromagnetic signal sources and, for each of the electromagnetic signal sources, fitting the measurements of received signal strength to a function of received signal strength with distance between the respective measurement point and the respective electromagnetic signal source, thereby obtaining parameters of the fitted function, the fitted function comprising as variables the received signal strength from the respective electromagnetic signal source and the distance between the respective measurement point and the respective electromagnetic signal source, the variables being related to each other by the parameters;
   for each of the electromagnetic signal sources, storing the parameters of the fitted function; and
   subsequently calculating the position of a user device by scanning for electromagnetic signal sources of known position, measuring the received signal strength from the scanned electromagnetic signal sources, retrieving the parameters of the function stored for the zone with reference to the scanned electromagnetic signal sources, using the function, the retrieved parameters and the received signal strengths measured by the user device to estimate the distance of the user device from each of the scanned electromagnetic signal sources; and
   estimating the position of the user device from the estimated distances from the scanned electromagnetic signal sources and the known positions of the electromagnetic signal sources.

2. A method according to claim 1, wherein the method comprises carrying out measurements in a plurality of zones, storing parameters for each zone and then using the parameters for the zone in which the user device is present to estimate the position of the user device.

3. A method according to claim 2, wherein the method comprises determining in which zone the user device is located from the measured signal strengths, retrieving the parameters of the function stored with reference to that respective zone and using the parameters stored with reference to that respective zone to estimate the position of the user device.

4. A method according to claim 2, wherein the method comprises storing measurements of the strength of the signal received from a plurality of electromagnetic sources for at least one measurement location in each zone.

5. A method according to claim 1, wherein the parameters of the function are stored with reference to the respective zone.

6. A method according to claim 5, wherein measurements are taken at a plurality of measurement points in each zone and parameters are calculated and stored with reference to each of a plurality of zones.

7. A method according to claim 1, wherein the function is a linear function of a logarithm of received signal strength with distance from the respective electromagnetic signal source.

8. A method according to claim 1, wherein the function is a non-linear function of a logarithm of received signal strength with distance from the respective electromagnetic signal source.

9. A method according to claim 1, wherein the method comprises updating the stored parameters, in response to making further measurements, or detecting a new electromagnetic signal source, or that an electromagnetic signal source has moved, or detection that an electromagnetic signal source has stopped operating or due to a change or correction in a map of the building or the boundaries of zones.

10. A method according to claim 1, wherein the method comprises making further measurements of the strength of the signal received from a respective electromagnetic signal source at a known position, recalculating the parameters for the respective electromagnetic signal source and updating the stored parameters.

11. A method according to claim 1, wherein the function of received signal strength with distance from an electromagnetic signal source is different for different electromagnetic signal sources, in at least some cases.

12. A method according to claim 1, wherein the function of received signal strength with distance from an electromagnetic signal source is different for the same electromagnetic signal source for different zones, in at least some cases.

13. A method according to claim 1, wherein the method comprise changing the function which is to be used for a particular electromagnetic signal source, and for a particular zone where appropriate, in response to making further measurements or detecting a new electromagnetic signal source, or that an electromagnetic signal source has moved or responsive to detection that an electromagnetic signal source has stopped operating or due to a change or correction in a map of the building or the boundaries of zones.

14. A non-transitory computer readable medium storing a database comprising the parameters obtained by the method of claim 1.

15. A method of storing data useful to estimate the position of a user device comprising the steps of:
   at each of a plurality of measurement points of known position within a zone, scanning for electromagnetic signal sources of known position, obtaining and storing measurements of the strength of the signal received from the scanned electromagnetic signal sources, to thereby obtain measurements of the strength of the signal received from a plurality of electromagnetic signal sources at a plurality of measurement points within the zone;
   processing the stored data, the positions of the plurality of measurement points and the positions of the electromagnetic signal sources and, for each of the electromagnetic signal sources, fitting the measurements of received signal strength to a function of received signal strength with distance between the respective measurement point and the respective electromagnetic signal source, thereby obtaining parameters of the fitted function the fitted function comprising as variables the received signal strength from the respective electromagnetic signal source and the distance between the respective measurement point and the respective electromagnetic signal source, the variables being related to each other by the parameters; and for each of the electromagnetic signal sources, storing the parameters of the fitted function.

16. A method according to claim 15, wherein the parameters are stored with reference to the respective zone and the method is repeated for each of a plurality of zones.

17. A computing device comprising a processor and a memory storing program code which, when executed by the processor, causes the processor to carry out the method of claim 15.

18. A non-transitory computer readable medium storing a database comprising the parameters obtained by the method of claim 15.

19. A method of estimating the position of a user device comprising the steps of: at each of a plurality of measurement points of known position within a zone, scanning for electromagnetic signal sources of known position, obtaining and storing measurements of the strength of the signal received from the scanned electromagnetic signal sources, to thereby obtain measurements of the strength of the signal received from a plurality of electromagnetic signal sources at a plurality of measurement points within the zone;

processing the stored data, the positions of the plurality of measurement points and the positions of the electromagnetic signal sources and, for each of the electromagnetic signal sources, fitting the measurements of received signal strength to a function of received signal strength with distance between the respective measurement point and the respective electromagnetic signal source, thereby obtaining parameters of the fitted function, the fitted function comprising as variables the received signal strength from the respective electromagnetic signal source and the distance between the respective measurement point and the respective electromagnetic signal source, the variables being related to each other by the parameters;

for each of the electromagnetic signal sources, storing the parameters of the fitted function; and subsequently estimating the position of a user device by scanning for electromagnetic signal sources of known position, measuring the received signal strength from the scanned electromagnetic signal sources, retrieving the parameters of the function stored for the zone with reference to the scanned electromagnetic signal sources and using the retrieved parameters, the received signal strengths measured by the user device and the known positions of the electromagnetic signal sources to estimate the position of the user device.

20. A method according to claim 19 comprising:

at each of a plurality of measurement points of known position within each of a plurality of zones, scanning for electromagnetic signal sources of known position, obtaining and storing measurements of the strength of the signal received from the scanned electromagnetic signal sources, to thereby obtain measurements of the strength of the signal received from a plurality of electromagnetic signal sources at a plurality of measurement points within each of the zones;

for each zone, processing the stored data, the positions of the plurality of measurement points and the positions of the electromagnetic signal sources and, for each of the electromagnetic signal sources, fitting the measurements of received signal strength to a function of received signal strength with distance between the respective measurement point and the respective electromagnetic signal source, thereby obtaining parameters of the fitted function, the fitted function comprising as variables the received signal strength from the respective electromagnetic signal source and the distance between the respective measurement point and the respective electromagnetic signal source, the variables being related to each other by the parameters; and for each zone, for each of the electromagnetic signal sources, storing the parameters of the fitted function;

wherein the step of estimating the position of the user device comprises scanning for electromagnetic signal sources of known position, measuring the received signal strength from the scanned electromagnetic signal sources, retrieving the parameters of the function stored for each of the zones with reference to the scanned electromagnetic signal sources and using the retrieved parameters, the received signal strengths measured by the user device and the known positions of the electromagnetic signal sources to estimate the position of the user device.

21. A method according to claim 20 comprising estimating the position of the user device by determining a zone in which the user device is located from the plurality of zones using the retrieved parameters for each of the zones, the received signal strengths measured by the user device and the known positions of the electromagnetic signal sources.

* * * * *